(12) United States Patent
Wild et al.

(10) Patent No.: US 7,591,363 B2
(45) Date of Patent: Sep. 22, 2009

(54) SYSTEM AND METHOD FOR DIVIDING A FLOW OF OBJECTS

(75) Inventors: Hans-Peter Wild, Eppelheim (DE); Eberhard Kraft, Neckarbischofsheim (DE); Frank Lechert, Weinheim (DE)

(73) Assignee: INDAG Gesellschaft fur Industriebedarf mbH & Co. Betriebs KG, Eppelheim (DE)

(*) Notice: Subject to any disclaimer, the term of this patent is extended or adjusted under 35 U.S.C. 154(b) by 81 days.

(21) Appl. No.: 11/829,678

(22) Filed: Jul. 27, 2007

(65) Prior Publication Data
US 2008/0023305 A1  Jan. 31, 2008

(30) Foreign Application Priority Data
Jul. 27, 2006 (EP) .................... 06015728

(51) Int. Cl.
*B65G 47/46* (2006.01)
(52) U.S. Cl. .................. 198/370.08; 198/440; 198/597
(58) Field of Classification Search .......... 198/597, 198/598, 370.08, 461.2, 890, 440, 441
See application file for complete search history.

(56) References Cited

U.S. PATENT DOCUMENTS

| | | | | |
|---|---|---|---|---|
| 3,165,193 A | * | 1/1965 | Stevenson, Jr. ............ | 198/415 |
| 3,170,572 A | * | 2/1965 | Harrison ................... | 209/583 |
| 5,042,636 A | | 8/1991 | Underwood | |
| 5,988,356 A | * | 11/1999 | Bonnet ..................... | 198/598 |
| 6,199,685 B1 | | 3/2001 | Fontanazzi | |
| 6,845,861 B2 | * | 1/2005 | Spatafora ................ | 198/471.1 |
| 6,962,250 B2 | * | 11/2005 | Van Liempd et al. ... | 198/457.06 |

FOREIGN PATENT DOCUMENTS

JP  06092436 A  4/1994

OTHER PUBLICATIONS

International Search Report in International Patent Application No. EP 06 00 9789, dated Sep. 22, 2006.

* cited by examiner

*Primary Examiner*—James R Bidwell
(74) *Attorney, Agent, or Firm*—Stroock & Stroock & Lavan LLP

(57) ABSTRACT

A system for dividing an object flow can provide slides which are constructed and arranged to displace one or more objects at a time from the object flow toward a different location, preferably another object flow. The slides can be pivotal away from the objects being displaced, thus releasing the objects at the desired location, the slides being reusable as the slides revolve about one or more rollers to and from displacing the objects. Preferably some of the objects are displaced from the object flow at an acute angle with respect to the direction of conveyance, which can provide displacement at a lesser force.

43 Claims, 6 Drawing Sheets

SYSTEM AND METHOD FOR DIVIDING A FLOW OF OBJECTS

BACKGROUND OF THE INVENTION

This invention relates, in general, to a system, apparatus and method for dividing a flow direction of objects, such as drink containers, into two or more flow directions. For example an object can be displaced from being transported in a first flow direction into a second flow direction.

Most systems currently available for dividing a flow direction of objects include displacing single objects from a flow direction using cams or plungers, which push the single objects from the side of the objects and cause the objects to move out of the first flow direction by displacement into a second flow direction. Flows having high throughput rates or closely spaced objects, however, typically require a high speed at which each single object is pushed out of the flow direction. The high speed can cause undesired deformation in flexible objects, such as foil bags.

In light of the shortcomings described above, it is desirable to provide an apparatus and system for dividing a flow of objects wherein the objects are handled gently while maintaining high throughrate.

SUMMARY

Generally speaking, the present invention is directed toward a system for dividing an object flow by providing slides which are constructed and arranged to displace one or more objects at a time from the object flow toward a different location, preferably to create a second object flow. The second object flow can be on the same conveyor as the original object flow or on one or more different conveyors. Preferably some of the objects are displaced from the object flow at an acute angle with respect to the direction of conveyance, which can provide displacement at a lesser force.

Preferably, the slides are pivotally mounted on a band that transports the slides in a circular motion so that the slides can return to the start position after displacing an object to the desired location. A guide can be provided to facilitate releasing the object at the desired location and also to facilitate return of the slide to repeat the process. The guide preferably pivots the slide to prevent contact between the slide and the object after the object is released.

Accordingly, it is an object of the invention to provide a system and apparatus for dividing an object flow that is suitable for high throughput rates and/or object flows having closely spaced objects without asserting substantial force on the object.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE FIGURES

For a fuller understanding of the invention, reference is had to the following description, taken in connection with the accompanying drawings, in which.

DETAILED DESCRIPTION

Figure 1:
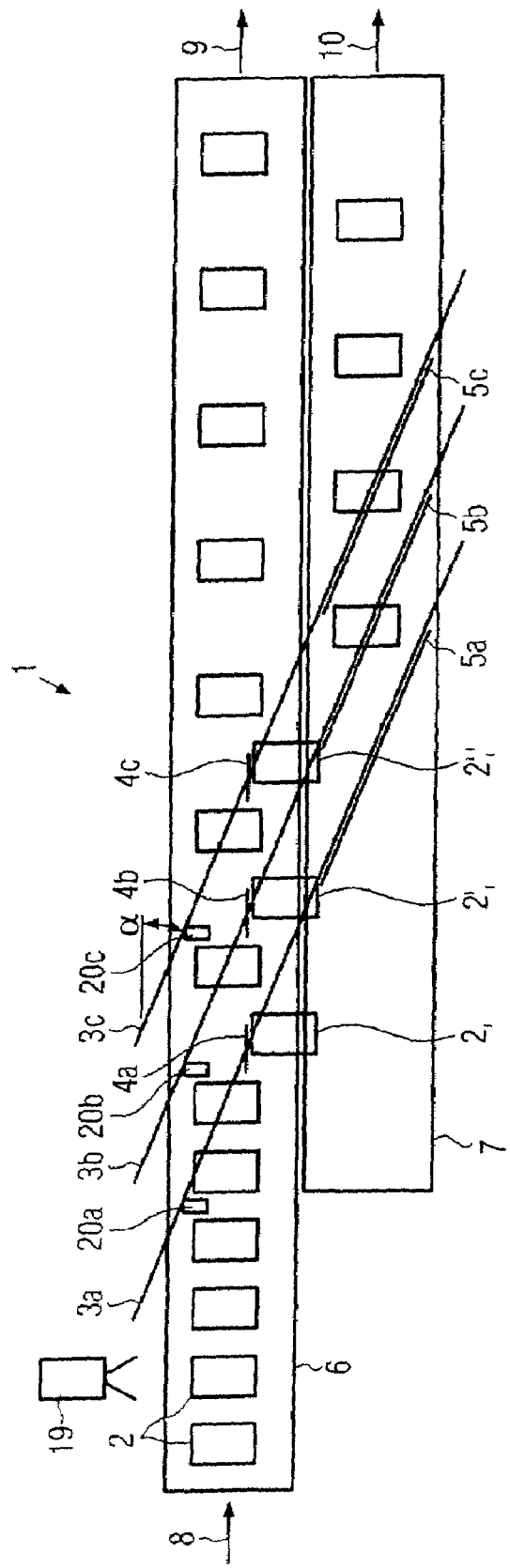
FIG. 1 is a top schematic view of a system in accordance with an embodiment of the invention.
Figure 2:
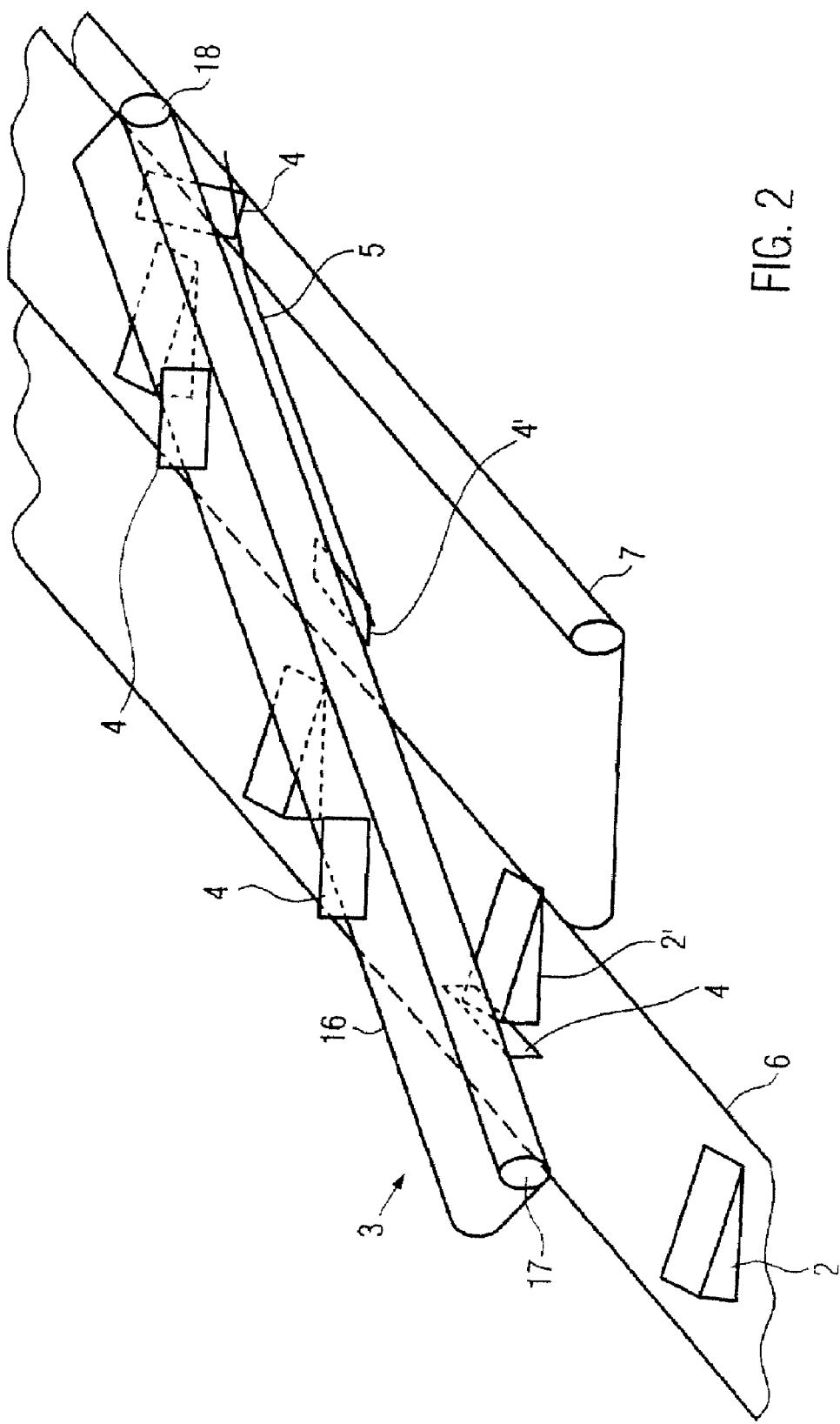
FIG. 2 is a perspective view of a system in accordance with an embodiment of the invention.

Reference is made to FIGS. 1-2, wherein a conveyor 6 for transporting objects 2 is illustrated. Whereas objects 2 are illustrated as being conveyed having equivalent spacing between each object, it is to be understood that varying and/or irregular spacing are also contemplated.

As shown, objects 2 can be transported by the conveyor 6 in direction 8. In the embodiment shown, a second conveyor 7 is also provided to which some of the objects 2 are transferred. It may be preferable for second conveyor 7 to be adjacent to conveyor 6 proximate where the objects are being displaced toward the second conveyor 7. However, it is to be understood that such an arrangement is not necessary and can be altered without deviating from the scope of the invention.

A dividing system in accordance with an exemplary embodiment of the invention includes slide devices 3a, 3b, 3c which can be constructed and arranged above the conveyors 6, 7. Whereas the example illustrated in FIG. 1 provides three slide devices 3a, 3b, 3c, it is to be understood that the number of slide devices can be varied as a matter of application specific design choice. For example, the dividing system can provide one slide device, two, four, or more slide devices without deviating from the scope of the invention. Each slide device 3a, 3b, 3c preferably includes a slide 4a, 4b, 4c movable along the slide device 3a, 3b, 3c in a displacement direction toward the second conveyor 7. Preferably the distance Examples of the object 2 include, by way of non-limiting example, foil bags such as stand-up pouches. The foil bags are preferably laid on their side with the bottom facing the slides 4a, 4b, 4c so that slides 4a, 4b, 4c can contact and push the bottom of the foil bags when displacing the foil bags toward the second conveyor 7. Preferably, the distance that slides 4a, 4b, 4c of each slide device 3a, 3b, 3c displace the objects 2 is predetermined.

Sensors 19, 20a, 20b, 20c can also be provided, which can detect an object 2 being transported toward the slide devices 3a, 3b, 3c. The sensors 19, 20a, 20b, 20c can be positioned, for example, above or adjacent to the conveyor 6. The sensors 19, 20a, 20b, 20c can send a signal or otherwise actuate one of the slide devices 3a, 3b, 3c to displace the object 2 from conveyor 6 onto the second conveyor 7. With the aid of the sensors 19, 20a, 20b, 20c, the division of product flow can be facilitated for both regular and irregular flow of objects 2 on conveyor 6. A sensor 19, 20a, 20b, 20c can be provided for each slide device 3a, 3b, 3c or alternatively, a common sensor can be provided for two or more slide devices as a matter of application specific design choice. For example, a single sensor 19 can be upstream from the first slide device 3a which is located the most upstream among the slide devices 3a, 3b, 3c.

In accordance with an exemplary embodiment of the invention, one sensor is provided for each slide device. Preferably, the sensors are constructed and arranged such that the desired division of the object flow is obtained, for example, not every object detected by the sensor will actuate the slide, but some objects may be permitted to pass without actuating the slide.

Referring to FIG. 1, the displacement direction of the slides 4a, 4b, 4c can have an angle a to the conveying direction 8. Preferably, angle a is less than about 90°, preferably between about 5° and 70°, more preferably between 15° and 30°, most preferably between about 20° and 25°. Such an angle can facilitate displacement of object 2' from an object flow having a high throughput rate by providing more time for displacement compared to a perpendicular displacement.

The slides 4a, 4b, 4c preferably contact object 2 on the side facing away from the second conveyor 7, for example, the bottom of the foil bag as described above. The slides 4a, 4b, 4c can apply a pressure on the side of object 2 and thus push and displace object 2 toward the second conveyor 7. Preferably the diagonal arrangement of the slide devices 3a, 3b, 3c permits the slides 4a, 4b, 4c to run partially along the conveying direction 8 and displace objects 2', 2", 2"' in the displacement direction partially perpendicular to the conveying direction 8 with respect to objects 2. Slides 4a, 4b, 4c can be adjacent to each other to provide simultaneous displacement of objects 2', 2", 2"'. Alternatively, the slides 4a, 4b, 4c can displace objects 2', 2", 2"' in a staggered manner, alternatingly, or have no relationship with each other without deviating from the scope of the invention.

As shown in FIGS. 1-2, slide devices 3a, 3b, 3c preferably include guides 5a, 5b, 5c, with which the slides 4a, 4b, 4c can be pivoted away from the objects 2', 2", 2"', for example folded back away from objects 2', 2", 2"' to release and terminate the displacement of objects 2', 2", 2"'. The position and arrangement of the guides 5a, 5b, 5c can determine the distance which objects 2', 2", 2"' travel, and the location at which objects 2', 2", 2"' can be displaced to and released. In the embodiment shown, the objects 2', 2", 2"' are released on second conveyor 7. Alternatively, or in combination, the displacement of objects 2', 2", 2"' can be terminated by, by way of non-limiting example, briefly stopping the slide 4a, 4b, 4c, after which the objects 2', 2", 2"' are transported away from the slides 4a, 4b, 4c by the second conveyor 7.

The slide devices 3a, 3b, 3c are preferably constructed and arranged such that objects 2', 2", 2"' being displaced are displaced from the conveyor 6 in their entirety, and thus fully displaced onto the second conveyor 7, preferably proximate the center of the second conveyor 7. Therefore, two rows of objects 2 being conveyed can be provided on conveyors 6, 7 in directions 9, 10, respectively. Whereas directions 9, 10 are illustrated as being substantially parallel, it is to be understood that directions 9, 10 can be perpendicular or form an angle therebetween. Alternatively, conveyors 6, 7 can have conveying directions 9 and 10 opposite of each other without deviating from the scope of the invention.

Reference is made to FIG. 2, wherein an exemplary embodiment of slide device 3 includes five slides 4, 4'. By providing multiple slides 4, 4', a slide 4 can be available to displace object 2' while additional slides 4 are returned to the start position from which the slides 4 can contact and displace object 2' and repeat the process. Therefore, more time and space may be provided between the slides 4.

Preferably a circulating chain or band 16 is provided by which slides 4, 4' can be displaced. The band 16 can be arranged, by way of non-limiting example, on the outer side of the slide device 3. The band 16 is preferably guided by one or more, preferably two, deflector rollers 17, 18, which can be driven by a motor (not shown). Preferably band 16 returns slides 4, 4' back to the start position from which slides 4, 4' can contact and displace objects 2, 2'. Additionally, increasing the number of slides 4 on a band 16 may simplify construction by increasing the distance between deflection rollers 17, 18.

The objects 2, 2' as illustrated in FIG. 2 and discussed above can be stand-up drink pouches laid on their side with the bottom of the pouches being contacted by the slides 4, 4' for displacement. The slides 4, 4' are preferably constructed and arranged such that they can be displaced on the underside of the slide device 3 from the conveyor 6 toward the second conveyor 7. Slides 4, which are also provided on the upper side of the slide device 3, can be returned from the second conveyor 7 toward conveyor 6, to the start position, from which the slide 4 can displace another object 2'. Therefore, the slides 4, 4' can circulate on band 16 and be reused.

A guide 5 is preferably provided proximate band 16 such that slide 4 can contact guide 5, preferably above the second conveyor 7. As shown in FIG. 2, once slide 4' contacts the guide 5, slide 4' is pivoted away from guide 5 and upward away from the second conveyor 7. Preferably, slide 4' can be pivoted such that slide 4' in the folded back position is substantially parallel to the band 16.

Figure 3:
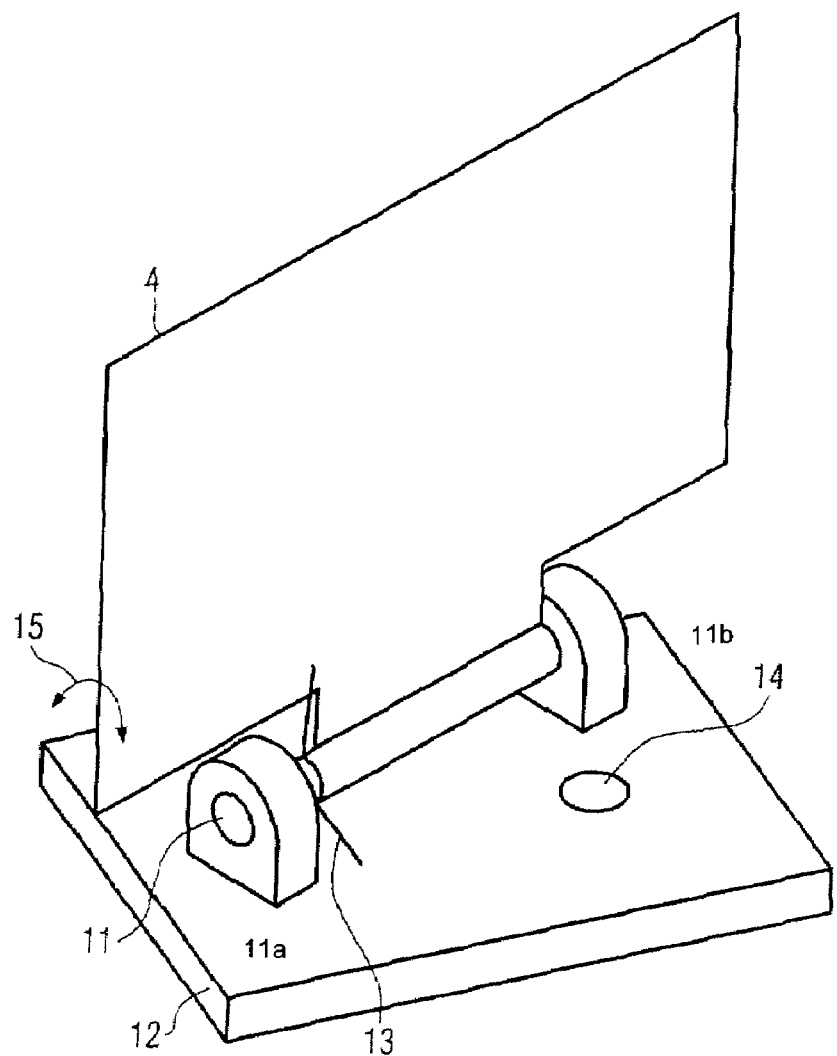
FIG. 3 is a perspective view of a holder and side in accordance with an embodiment of the invention.

Referring to FIG. 3, an exemplary embodiment of a holder for a slide 4 is illustrated. The slide 4 includes a displacement element, such as a plate or a suitable large-format piece. The plate can be pivotally mounted on one side about an axle 11. Therefore, the slide 4 can be pivotally connected to a base plate 12. The base plate 12 can be rectangular, square, or any other shape as a matter of application specific design choice. The slide 4 is preferably arranged substantially diagonal to the sides of the square or rectangular shape of the base plate 12. Preferably, the base plate 12 is fastened to the band 16 with features 14, such as apertures through which the band 16 can be extended.

In the embodiment shown, slide 4 can pivot in one direction, for example, in a clockwise direction. Slide 4 is preferably biased by a spring 13 such that slide 4 is pretensioned in the position shown in FIG. 3. Therefore, slide 4 preferably pivots in the clockwise direction but not the counter-clockwise direction. In the embodiment shown, spring 13 is positioned about axle 11. Whereas the spring 13 is positioned about the axle, between axle holders 11a, 11b. It is to be understood that the spring 13 can be located outside the holders or in some other suitable arrangement. Preferably a stopper can be provided which limits the movement of axle 11 or slide 4. For example, the spring 13 can be arranged such that the spring 13 applies a force on the slide 4 or the axle 11 against the stopper. Alternatively, a separate stopper element can be provided without deviating from the scope of the invention.

Figure 4:
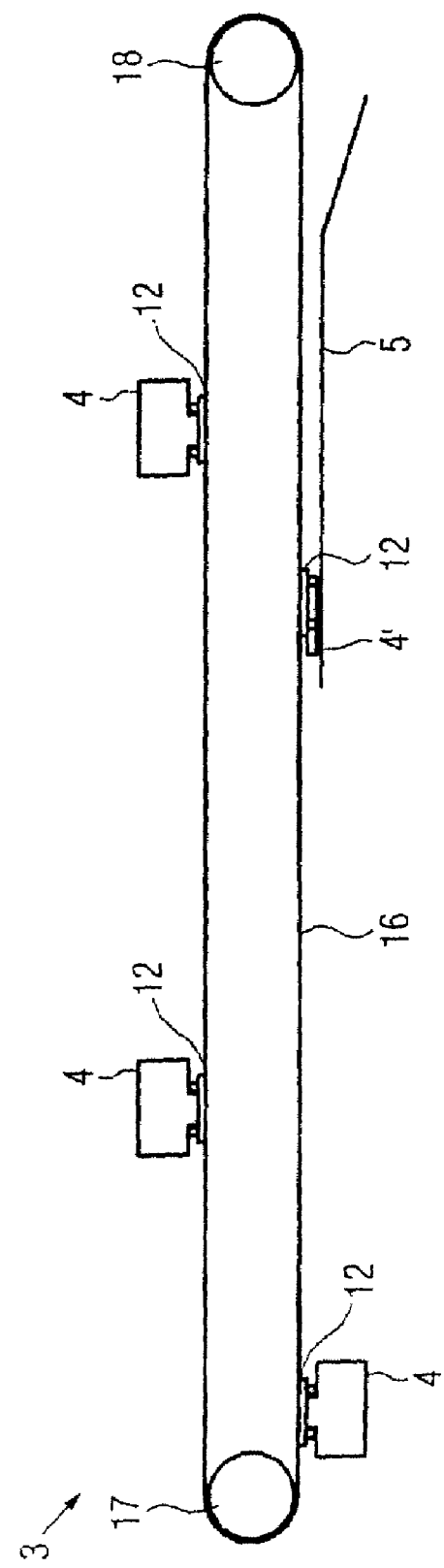
FIG. 4 is a side elevational view of a system in accordance with an embodiment of the invention.

FIG. 4 shows a side view of an embodiment of a slide device 3, wherein four slides 4, 4' are arranged on the band 16 to circulate on the band 16. As shown, slides 4 can be constructed and arranged with the base plates 12 on the band 16. Also, FIG. 4 illustrates an embodiment of guide 5 and its relationship with slide 4. More specifically, as shown, slide 4 can pivot away from the guide 5 and toward the band 16. Preferably, the guide 5 pivots the slide 4 against the biasing force or pretension of the spring 13.

Preferably, whereas the biasing force of the spring 13 is weaker than the force between the slide 4 and the guide 5, the biasing force is greater than the force exerted between the slide 4 and the object 2, thus substantially preventing slide 4 from pivoting away from object 2, thus permitting slide 4 to displace object 2. The guide 5 can be constructed and arranged to release the slide 4 gradually, as shown in FIG. 4, wherein the guide 5 has a diverging portion downstream from where the guide 5 first contacts the slide 4. Therefore, rather than abruptly pivoting back to its pretensioned state due to the biasing force of the spring 13, the slide 4 can gradually return to its pretensioned state, otherwise referred to as its displacement position. Preferably, when the slide 4' is pivoted toward the band 16 by the guide 5, objects 2 can pass below the slide 4', for example on the second conveyor 7, without contacting the slide 4'.

An example of the process in which objects 2 are displaced from a conveyor 6 to a second conveyor 7 to divide the object flow on conveyor 6 will be described in detail herein. Referring to FIG. 1, a plurality of objects 2 can be transported on conveyor 6 in conveying direction 8 along an object flow. A slide 4a on band 16 can engage one side of an object 2' and continue in a displacement direction which is at an angle α to conveying direction 8. Preferably, angle α is less than about 90°, preferably less than about 70°, most preferably between about 20° and 25°. Slide 4a thus preferably displaces object 2' toward second conveyor 7.

In accordance with an exemplary embodiment, slide 4 is displaced in conveying direction 8 by a first drive and in a direction perpendicular to the conveying direction 8 by a second drive, so that slide 4 is displaced at angle a toward the second conveyor 7. Therefore, slide 4 can preferably be displaced relatively slowly in the transverse direction to the conveying direction 8, and therefore displace object 2 comparatively gently. The accompanying movement of the slide 4 in the conveying direction 8 can provide more time for displacing the object 2' so that the displacement can be relatively slow. Thus, slide 4 preferably displaces object 2' out of the flow of objects on conveyor 6 and toward second conveyor 7 without excessive force and thus preferably without deforming object 2', which is a drawback of many systems currently available.

After object 2' has been displaced onto second conveyor 7, slide 4a preferably contacts guide 5a and pivots toward band 16 and away from object 2', such as illustrated in FIG. 4. Slide 4' can continue in the pivoted position until slide 4' reaches the diverging portion of the guide 5, whereupon slide 4' can gradually pivot back to its biased, pretensioned state. Object 2' is preferably transported on second conveyor 7 in direction 10. The objects 2 that were not displaced by slides 3a, 3b, 3c can remain in the object flow and continue on conveyor 6 in direction 9. Objects 2' preferably do not contact slide 4' once slide 4' pivots away from object 2'.

As shown in FIGS. 2 and 4, slide 4 can then circulate around the deflection roller 18 back toward conveyor 6 by the movement of band 16 until it is ready to engage and displace another object 2, and the process can be repeated. In accordance with an exemplary embodiment of the invention, multiple slide devices 3a, 3b, 3c can be provided, preferably adjacent and parallel to each other, to displace three objects 2', 2", 2'''. Preferably objects 2', 2", 2''' are adjacent to or spaced one or more objects 2 apart from each other on conveyor 6. Alternatively, objects 2', 2", 2''' can be spaced apart randomly, with no specific sequence. Preferably, objects 2', 2", 2''' are displaced toward and released on second conveyor 7, and are subsequently transported on conveyor 7.

Preferably, guide 5a, 5b, 5c are constructed and arranged such that the objects 2 displaced onto second conveyor 7 do not contact any of the slides 4a, 4b, 4c when the slides are pivoted toward the band 16. For example, referring to FIG. 1, object 2' preferably does not contact slide 4a which displaced object 2', or slides 4b or 4c downstream on second conveyor 7 from where object 2' is released as object 2' is transported in direction 10.

By providing a plurality of slide devices, it can be possible to provide slides 4 that displace objects 2 at high throughput rates without the need for a high rate of displacement. More specifically, in accordance with the embodiment shown in FIG. 1, each slide device 3 contacts and displaces every sixth object 2 in the object flow on conveyor 6 for a one-to-one division into the two flows of objects, one on conveyor 6 and one on second conveyor 7. Whereas every two objects 2 are displaced in the embodiment shown, each slide 4 displaces every sixth object 2 from the object flow, and thus can contact the object at a slower rate than if a single slide device 3 was displacing all the objects 2 for the second flow.

Figure 5A:
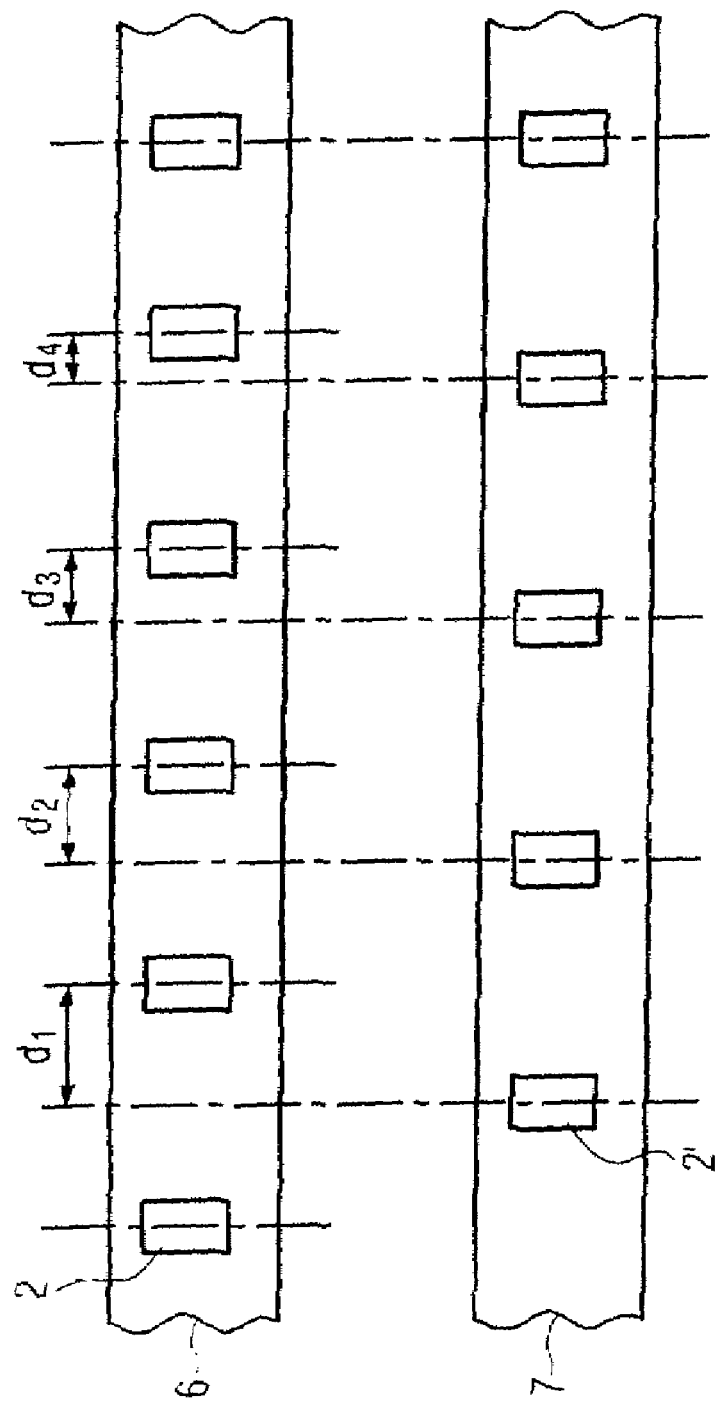
FIG. 5a is a top view of a conveying region in accordance with an embodiment of the invention.

FIG. 5a shows two substantially straight conveyors 6, 7 at a position downstream from the slides 3 in accordance with an embodiment of the invention. As shown, objects 2 are transported on conveyor 6 and objects 2' are transported on conveyor 7. In the embodiment shown, conveyor 6 and conveyor 7 have different speeds of conveyance. Therefore, the distance d1, d2, d3, d4 of two objects 2, 2' on conveyors 6, 7 can vary, as shown. More specifically, whereas the objects 2, 2' are shown as approximately adjacent, the subsequent objects 2, 2' can be offset at varying distances d1, d2, d3, d4. It is to be understood that conveyors 6, 7 can have the same speed or different speeds without deviating from the scope of the invention.

In accordance with an exemplary embodiment, conveyor 6, 7 can include more than one section having different speeds. For example, the second conveyor 7 in FIG. 5a can have a first section having the same speed as conveyor 6 and onto which the objects are displaced. The first conveyor section can be connected to a second conveyor section which can receive the objects from the first conveyor section at a higher conveying speed than the first conveyor section and/or conveyor 6. Therefore, second conveyor 7 can be constructed and arranged to permit objects 2' on second conveyor to catch up with the corresponding object 2 on conveyor 6 or vice versa. For example, the distance d1, d2, d3, d4 can be recovered by a faster conveyor 7 or a section thereof, such that the corresponding objects 2, 2' can be deposited to a common station simultaneously. Alternatively, the conveyors 6, 7 can transport objects 2, 2' to another conveyor (not shown) for further transport.

Figure 5B:
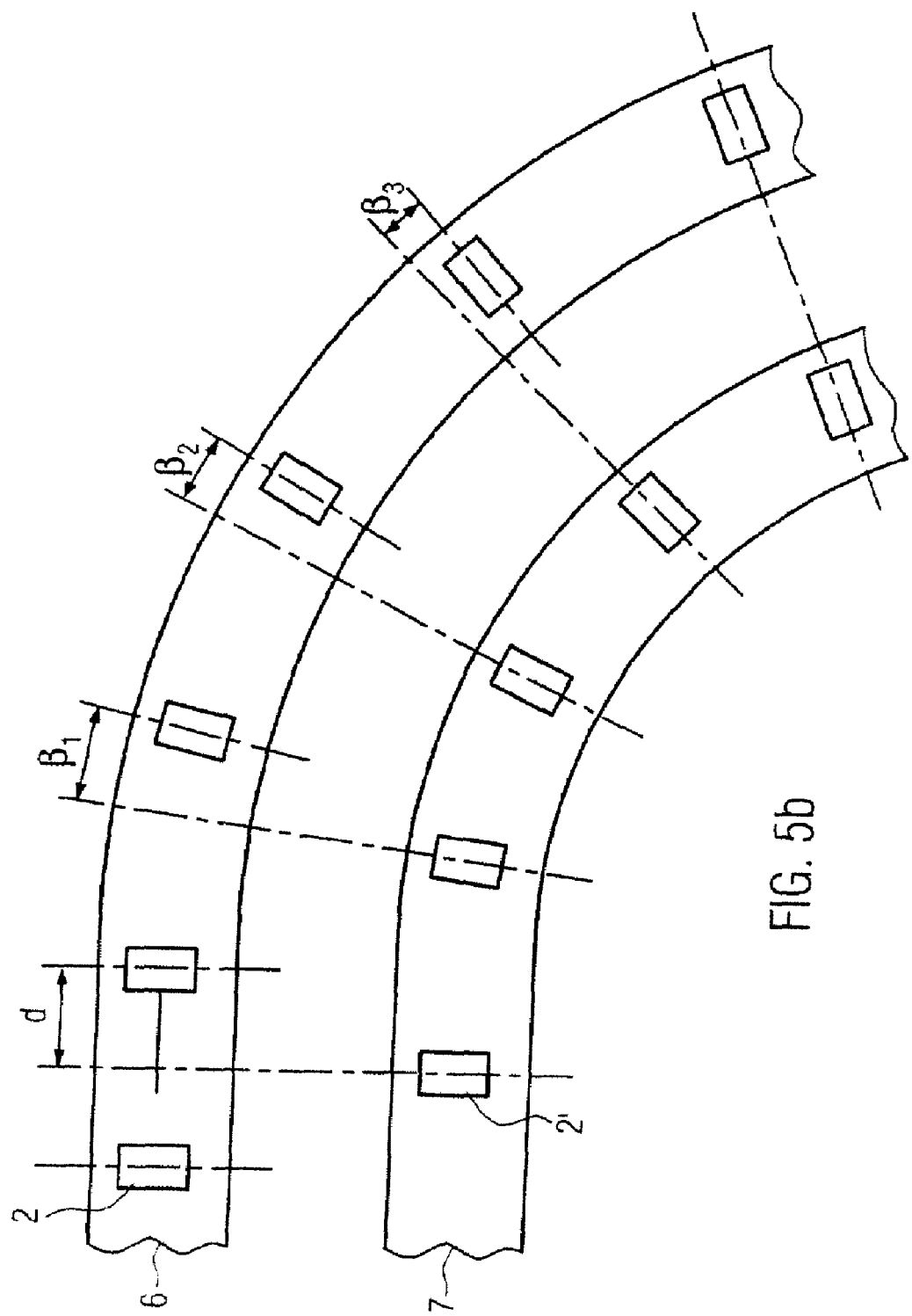
FIG. 5b is a top view of a conveying region in accordance with an embodiment of the invention.

FIG. 5b shows an embodiment of conveyors 6, 7 having a curved shape. Because the conveyors 6, 7 have different shaped paths, the angular offset β between corresponding objects 2, 2' on conveyors 6, 7 can change. Therefore, the angular offset β can be reduced to zero without providing different conveyor sections having different speeds, and the corresponding objects 2, 2' can be transferred to a common station simultaneously. However, it is to be understood that one or more of the conveyors 6, 7 can have either or both a curved shape and sections of varying speeds.

Whereas the embodiments described herein provide more than one conveyor 6,7, it is to be understood that the slide device 3 can displace the object 2 to another object flow on the same conveyor 6. Preferably, the object 2 is displaced at least the width of the object outward from the object flow path, thus providing two distinct object flows. The object flows, whether on the same or different conveyors, can also be adjusted by guides, rails, and the like.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the difference in speed of the conveyors, the number of conveyors, the number of conveyor sections, the number and arrangement of slide devices, the relationship between the guide and the slide, the spring, etc. can be varied without deviating from the scope of the invention as a matter of application specific to design choice. Additionally, conveyors 6, 7 can be on the same plane or on a different plane, for example, wherein conveyor 6 is higher up than conveyor 7 or vice versa, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A system for dividing a flow of objects into two or more flows, the apparatus comprising:
   a conveyor for providing a flow of objects in a conveying direction;
   a slide device having at least one slide constructed and arranged to displace one or more objects in a displacement direction; and
   a second conveyor constructed and arranged to receive the objects being displaced by the slide;
   wherein the conveyor has a first conveying path capable of providing a first flow of objects, the first conveying path having a first radius of curvature and the second conveyor has a second conveying path capable of providing a second flow of objects, the second conveying path having a second radius of curvature different from the first radius of curvature; and
   wherein the displacement direction has an angle of less than 90° with respect to the conveying direction.

2. The system of claim 1, wherein the angle is less than about 70°.

3. The system of claim 1, wherein the angle is less than about 60°.

4. The system of claim 1, wherein the angle is less than about 50°.

5. The system of claim 1, wherein the angle is less than about 4°.

6. The system of claim 1, wherein the angle is less than about 30°.

7. The system of claim 1, wherein the angle is less than about 20°.

8. The system of claim 1, wherein the angle is greater than about 5°.

9. The system of claim 1, wherein the angle is greater than about 10°.

10. The system of claim 1, wherein the angle is greater than about 15°.

11. The system of claim 1, wherein the angle is greater than about 20°.

12. The system of claim 1, wherein the angle is between about 20° and 25°.

13. The system of claim 1, wherein the objects are foil bags.

14. The system of claim 1, wherein the conveyor and the second conveyor are constructed and arranged such that an object on the conveyor and an object on the second conveyor are transported adjacently at a point in time.

15. The system of claim 1, wherein the conveyor and the second conveyor have different conveying speeds.

16. The system of claim 1, wherein the conveyor and the second conveyor have differently shaped conveying paths with different path lengths.

17. The system of claim 1, wherein the slide is constructed and arranged to displace the object a displacement distance, the object having a width, wherein the displacement distance in the displacement direction is greater than the width of the object.

18. The system of claim 1, wherein the slide device further comprises a band and two deflection rollers, wherein the band is connected to the slides and transports the slides around the deflection rollers.

19. The system of claim 1, wherein the slide device comprises a plurality of slides.

20. The system of claim 1, comprising a plurality of slide devices constructed and arranged such that a plurality of the slides simultaneously displace a plurality of the objects.

21. The system of claim 1, comprising a plurality of slide devices arranged adjacent and parallel to each other.

22. The system of claim 1, wherein the slide device further comprises an axle connected to the slide, the slide being pivotally associated with the axle.

23. The system of claim 1, wherein the slide device further comprises a guide constructed and arranged to pivot the slide away from the object.

24. The system of claim 1, wherein the slide device further comprises a spring constructed and arranged to apply a biasing force on the slide toward a displacing position.

25. The system of claim 1, further comprising a sensor constructed and arranged to actuate the slide device.

26. A system for dividing a flow of objects into two or more flows, the apparatus comprising:
    a conveyor for providing a flow of objects in a conveying direction; and
    a slide device having at least one slide constructed and arranged to displace one or more objects in a displacement direction, the slide device having a spring constructed and arranged to apply a biasing force on the slide toward a displacing position;
    wherein the displacement direction has an angle of less than 90° with respect to the conveying direction.

27. The system of claim 26, further comprising a second conveyor constructed and arranged to receive the objects being displaced by one of the at least one slides.

28. The system of claim 26, wherein the conveyor has a first conveying path having a first radius of curvature and the second conveyor has a second conveying path having a second radius of curvature different from the first radius of curvature.

29. A system for dividing a flow of objects into two or more flows, the system comprising:
    a first conveyor constructed and arranged to convey a first flow of objects in a first conveying path;
    a second conveyor constructed and arranged to convey second flow of objects in a second conveying path; and
    at least two slides constructed and arranged to displace at least two objects from the first conveyor to the second conveyor in a displacement direction at an angle of less than 90° with respect to the first conveying path;
    wherein the first conveying path has a first radius of curvature and the second conveying path has a second radius of curvature different from the first radius of curvature.

30. The system of claim 29, wherein the slides are arranged adjacent and parallel to each other.

31. A method for dividing a flow of objects into two or more flows, the method comprising:
    transporting a first flow of objects on a first conveyor in a conveying direction along a first conveying path having a first radius of curvature; and
    displacing at least one of the objects in a displacement direction onto a second conveyor capable of providing a second flow of objects, the displacement direction having an angle of less than 90° to the conveying direction; and conveying the at least one of the objects on the second conveyor along a second conveying path having a second radius of curvature different from the first radius of curvature.

32. A method for dividing a flow of objects into two or more flows, the method comprising:

supplying a first flow of objects in a first direction along a first path having a first radius of curvature;

simultaneously displacing at least two of the plurality of objects from the first direction to a second direction having an angle of less than 90° with respect to the first direction, onto a second path; and transporting the at least two of the plurality of objects along a second path having a second radius of curvature different from the first radius of curvature.

33. A system for dividing a flow of objects into two or more flows, the system comprising:

a first conveyor constructed and arranged to convey a first flow of objects along a first conveying path;

a second conveyor constructed and arranged to convey a second flow of objects along a second conveying path; and at least two slides constructed and arranged to displace at least two objects from the first conveyor to the second conveyor at an angle of less than 90°, the slide device having a spring constructed and arranged to apply a biasing force on the slide toward a displacing position.

34. A method for dividing a flow of objects into two or more flows, the method comprising:

providing a slide;

providing a spring to urge the slide toward a displacing position;

providing a conveyor capable of providing a flow of objects;

transporting objects on the conveyor in a conveying direction; and displacing at least one object from the conveyor in a displacement direction at an angle of less than 90° to the conveying direction utilizing the slide.

35. A method for dividing a flow of objects into two or more flows, the method comprising:

supplying a flow of objects in a first direction;

providing a slide device urged toward a displacement position;

displacing the slide device toward the displacement position; and simultaneously displacing at least two of the plurality of objects with the slide device from the first direction, at an angle of less than 90°, to a second direction.

36. A system for dividing a flow of objects into two or more flows, the apparatus comprising:

a conveyor for providing a flow of objects in a conveying direction; and a slide device having at least one slide constructed and arranged to displace one or more objects in a displacement direction; and a sensor constructed and arranged to detect an object on the conveyor to be displaced, and to initiate the movement of the slide device in the displacement direction toward the object;

wherein the displacement direction has an angle of less than 90° with respect to the conveying direction.

37. A system for dividing a flow of objects into two or more flows, the system comprising:

a first conveyor constructed and arranged to convey a first flow of objects in a first conveying path;

a second conveyor constructed and arranged to convey a second flow of objects in a second conveying path;

at least two slides constructed and arranged to displace at least two objects from the first conveyor to the second conveyor along a displacement path at an angle of less than 90°; and a sensor constructed and arranged to detect an object in the first conveying path to be displaced, and to initiate the movement of the slide device along the displacement path toward the object.

38. A method for dividing a flow of objects into two or more flows, the method comprising:

providing a slide;

transporting a plurality of objects on the conveyor in a conveying direction in a first flow;

providing a sensor for detecting an object that is being transported for initiating the movement of the slide;

detecting the object;

initiating the movement of the slide in a displacement direction at an angle of less than 90° to the conveying direction toward the object; and displacing the object from the conveyor with the slide in the displacement direction into a second flow;

transporting the plurality of objects in the first flow and in the second flow.

39. A method for dividing a flow of objects into two or more flows, the method comprising:

supplying a first flow of objects in a first direction;

providing at least two slide devices;

providing a sensor for detecting at least two of the objects from the first flow to be displaced for initiating the movement of the slide devices toward the at least two objects;

detecting the at least two objects;

initiating the displacement of the at least two slide devices in a second direction at an angle of less than 90° from the first direction toward the at least two objects; and simultaneously displacing the at least two objects from the first direction to the second direction into a second flow of objects utilizing the at least two slide devices.

40. A system for dividing a flow of objects into two or more flows, the apparatus comprising:

a first conveyor for providing a flow of objects in a conveying direction;

a slide device having at least one slide constructed and arranged to displace one or more objects from the first flow in a displacement direction at an angle of less than 90° with respect to the conveying direction; and a second conveyor constructed and arranged to receive the objects being displaced by the at least one slide and capable of providing a second flow of objects;

wherein the first conveyor and the second conveyor are constructed and arranged such that a first object on the first conveyor and a second object on the second conveyor are transported adjacently at a point in time;

wherein the first conveyor and the second conveyor have different conveying speeds.

41. A system for dividing a flow of objects into two or more flows, the system comprising:

a first conveyor constructed and arranged to convey a first flow of objects in a first conveying path;

a second conveyor constructed and arranged to convey a second flow of objects; and at least two slides constructed and arranged to displace at least two of the objects along a displacement path, at an angle of less than 90° with respect to the first conveying path, from the first conveyor to the second conveyor;

wherein the first conveyor and the second conveyor are constructed and arranged such that at least one of the objects on the first conveyor and one of the at least two objects on the second conveyor are transported adjacently at a point in time; and wherein the first conveyor and the second conveyor have different conveying speeds.

42. A method for dividing a flow of objects into two or more flows, the method comprising:

transporting a plurality of first objects and a plurality of second objects in a first flow in a conveying path;

providing a slide;

displacing the second objects from the first conveyor to a second conveyor by moving the slide in a displacement direction at an angle of less than 90° to the conveying path;

transporting the first objects on the first conveyor at a first speed;

transporting the second objects on the second conveyor in a second flow at a second speed different from the first speed; and simultaneously transporting one of the first objects on the first conveyor adjacently to one of the second objects on the second conveyor.

43. A method for dividing a flow of objects into two or more flows, the method comprising:

transporting a plurality of first objects and a plurality of second objects on a first conveyor;

simultaneously displacing at least two of the second objects from the first conveyor to a second conveyor;

transporting the plurality of first objects on the first conveyor at a first speed;

transporting the at least two of the second objects on the second conveyor at a second speed different from the first speed; and simultaneously transporting one of the first objects on the first conveyor adjacently to one of the second objects on the second conveyor.

* * * * *